April 17, 1934.     E. E. DRAPER     1,955,275
APPARATUS FOR MAKING STEREOSCOPIC PICTURES BY INSTANTANEOUS EXPOSURE
Filed April 24, 1931    2 Sheets-Sheet 1
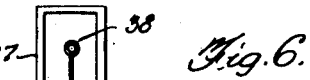
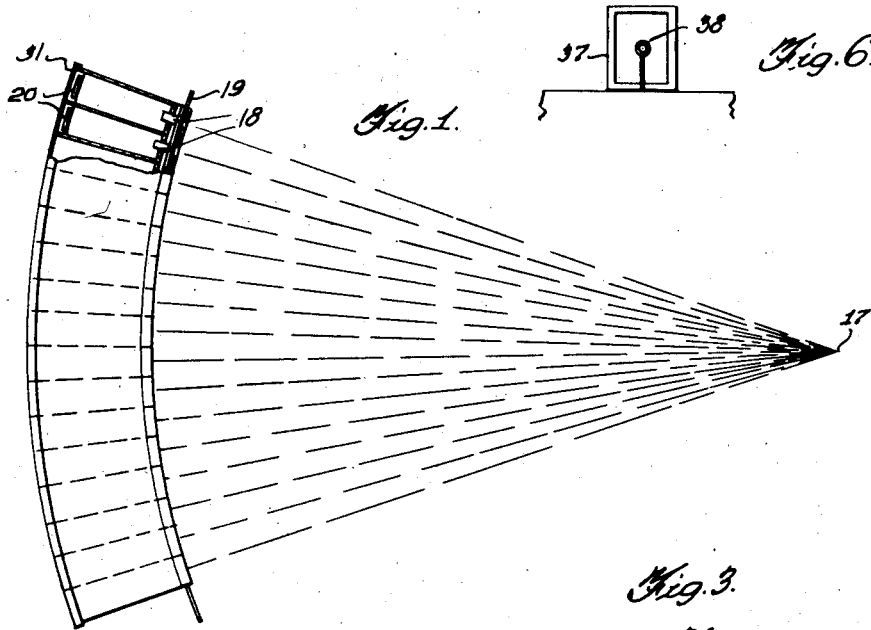
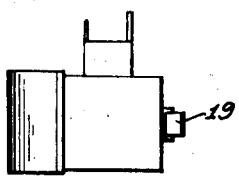
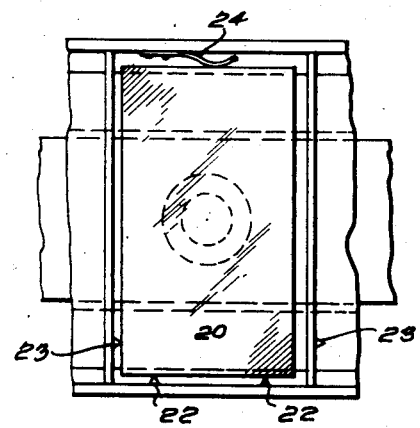
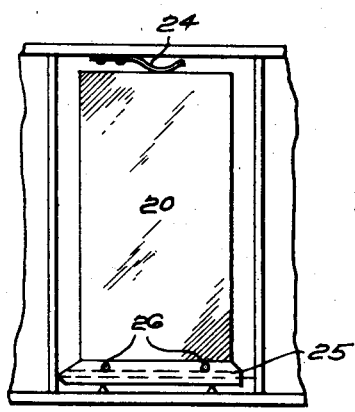
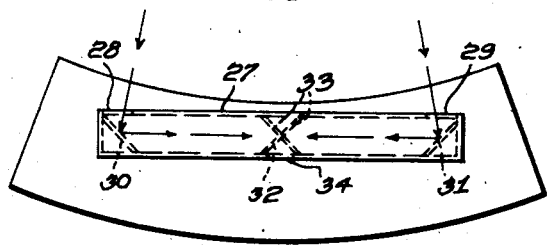

April 17, 1934.    E. E. DRAPER    1,955,275
APPARATUS FOR MAKING STEREOSCOPIC PICTURES BY INSTANTANEOUS EXPOSURE
Filed April 24, 1931    2 Sheets-Sheet 2
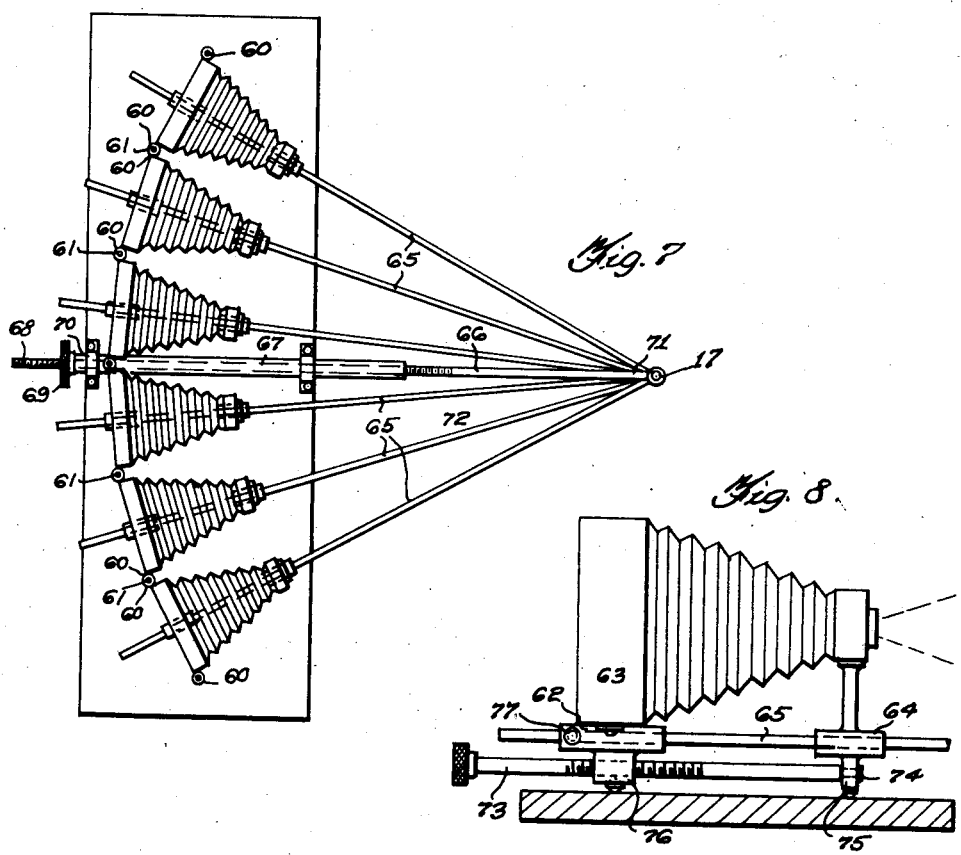
INVENTOR.
Ernest E. Draper
BY
Harry Lea Dodson
ATTORNEY.

Patented Apr. 17, 1934

1,955,275

UNITED STATES PATENT OFFICE 1,955,275

APPARATUS FOR MAKING STEREOSCOPIC PICTURES BY INSTANTANEOUS EXPOSURE

Ernest E. Draper, Scarsdale, N. Y., assignor to The Perser Corporation, New York, N. Y., a corporation of New York Application April 24, 1931, Serial No. 532,525

6 Claims. (Cl. 95—18)

My invention relates to that class of stereoscopic pictures which are made by the method invented by Dr. Kanolt and which are termed "Depthographs." These are made by swinging a camera in an arc of a circle about the subject which is being photographed. The exposure being made through a line screen consisting of alternate opaque and transparent vertical lines, the plate which is being exposed being synchronized with the movement of the camera and moving in relation to the line screen as the camera travels through the arc. The negative thus formed is projected onto a sensitized plate forming a positive which, when viewed with a viewing line screen, gives a true stereoscopic picture. This method is highly satisfactory except for certain conditions such as for example, portraiture, in which the subject may present a strained and unnatural appearance owing to the length of time required for the exposure; also there is liable to be a blur on the picture due to some movement of the subject while the camera is traveling through the arc; again in the case of children or animals it is difficult, if not actually impossible to keep them still for so long a time; out of door pictures, where there is always a certain amount of motion going on, such as trees moving from the wind, all of these present insuperable obstacles to good work except by instantaneous exposure.

My invention has for its object to provide a camera which can be operated under proper conditions in a fraction of a second, to produce a stereoscopic negative thus making it possible and available for use in all of the conditions above referred to.

A further object is to produce a camera for such use that will have no moving parts at the time of exposure.

A further object is to construct such a camera which will be portable and adjustable to photograph objects at various distances.

A further object is to provide improved means for projecting the individual negatives to make the desired positive.

A further object is to provide means to accurately determine when the camera is in the correct position.

A further object is to provide automatically operating means to move all of the cameras in a unit.

A further object is to provide means to permit the cameras to be focused. The preferred form for attaining my principal object is by placing a multiplicity of cameras in juxtaposition in the arc of a circle about the object to be photographed. The cameras are equipped with matched lenses of equal focal length. Each camera is loaded with a sensitized plate and the plates are simultaneously exposed. The most important object should be placed in the centre of the back ground and in the case of a portrait I find it desirable to suspend a plumb line which has a cross bar attached to it above the center of the arc high enough so that it will be outside of the finished picture but low enough to appear on the end of each negative. After these plates are developed they are projected one at a time, starting with the one made at the extreme end of the arc, onto a sensitized plate of the desired size through a vertical line screen having opaque lines wide in proportion to the transparent ones. I may use a screen consisting of a plurality of opaque dots on a transparent back ground the opaque dots being large in proportion to the intermediate clear spaces, or any other grill that is suitable to be employed for this purpose.

After one negative is projected, the sensitized plate is moved horizontally to cover the part of the plate that has been exposed and opening for exposure a new part of the plate. This process is repeated until all the negatives are assembled on the one plate. Between the exposures the movement of the plate must be so related to the width of the transparent vertical line and to the number of individual exposures to be used, that each resulting band of picture strips very nearly equals in width the combined width of one opaque and one transparent vertical line. When this exposed plate is developed it will be a stereoscopic positive. In practise a contact or projection negative could be made from it which in turn could be used to make any number of positives desired.

A concrete embodiment of means to accomplish the desired objects of my invention is disclosed in the accompanying drawings which are furnished to show a preferred structure and are not to be deemed as limitations to my invention as I do not wish to be understood as limiting myself to specific details except as such limitations appear in the claims.

Fig. 1 of the drawings is a top or plan view, more or less diagrammatic, of my camera;

Fig. 2 is a side view;

Fig. 3 is an enlarged rear view with the cover removed showing how the photographic plate is located and held in position;

Fig. 4 is a modified means of holding the plate which is necessary should the edges of the plate be chipped or uneven;

Fig. 5 is a top or plan view of the direction finder;

Fig. 6 is a modified form of direct view finder;

Fig. 7 is a top or plan view of my means to automatically vary the position of all the cameras as a unit;

Fig. 8 shows means for focusing the cameras of Fig. 7;

Fig. 9 is a detail view of means to clamp the cameras after they have been adjusted simultaneously for arcs of various radii so the rods may be removed.

Similar reference numerals refer to similar parts throughout the entire description.

As shown in the drawings Fig. 1 shows a multiplicity of cameras 1 to 16 all of which are pointed to a common center 17 of the arc of the circle on which the cameras are arranged. The cameras are equipped with lenses 18. A shutter 19 is provided to expose all of the plates 20. A detachable cover 21 is provided to exclude the light from the plates 20. It is of the utmost importance that the plates 20 when returned to the camera, if it is to be used as a projector, shall be in the same position as when exposed. Means to accomplish this is shown in Fig. 3 in which each camera is provided with points 22 and 23 which form a registering corner to engage the edges of the plate 20. A spring 24 being provided to hold the plates in position. This is necessary so that the only change from one strip picture to another on the final positive is that change which is due to the difference in angle at which the subject is photographed. By this construction providing each camera as it does with a registering corner so arranged with relation to the lens that the image of the point 17 about which the arc is drawn passes through the same point on a ground glass (not shown) when it is held in each registering corner. Obviously the same would be true in projecting each developed negative when it is held in the registering corner by the spring 24. Should the plates 20 have uneven or chipped edges they should be proided with metal edges 25 seen in Fig. 4. These edges may be held in place by screws 26 or in any other suitable or convenient manner. Although I prefer only to sensitized plates for the cameras it will be clear that films may also be used if desired.

My means for determining the correct position of the camera is shown in Fig. 5 in which a tube 27 provided with openings 28 and 29 in the front wall adjacent the ends of the tube, is secured to the top of the cameras. Mirrors 30 and 31 are mounted in the tube at such an angle that when the plumb line is suspended at the center 17 of the arc its reflections will be thrown onto two mirrors 32 and 33 located in the center of the tube 27 opposite an opening 34 in the rear wall. Each one of which is one half the height of the tube and at such an angle that one throws the reflection of the mirror 30 back into the eye of the operator of the camera while the other one does the same for the mirror 31 at the other end of the tube 27. The mirrors are set permanently on the inflexible camera in such a position that when the plumb line is at the center 17 of the arc the images of it in the central mirrors 32 and 33 coincide to form one line thus determining accurately that the camera is in the correct position. Should the camera be tipped or tilted from the horizontal the line will break into two parts, each being at an angle. A simple form of direct view finder might be as seen in Figs. 1 and 6 in which three cases 35, 36 and 37 are mounted on the ends and center of the camera. These are provided with mirrors 38 having an image of the plumb line scribed thereon. Obviously when these coincide with the reflection of the plumb line the camera will be accurately positioned. Under certain circumstances it may be desirable to arrange the cameras so that they can be simultaneously adjusted to a greater or less radius. This can be done by the mechanism shown in Figs. 7 and 8 in which all of the cameras (as shown there are only 6 though, of course, there can be as many as desired) are maintained in a position which causes them to always point to a common center. I accomplish this by arranging for them to be connected by hinges 60 which are provided with hinge pins 61 which permit them to swing towards or away from each other. The cameras each have a sleeve 62 below the box 63 and another sleeve 64 below the lens, these sleeves are telescoped by rods 65 which converge to the center 17. At the center of the arc I mount a rod 66 in a sleeve 67, one end 68 of the rod 66 is threaded and has a nut 69 mounted thereon. The nut 69 abuts a stationary collar 70. The other end 71 is secured at center 17, a scale 72 is formed on the rod 66 adjacent the inner end of the sleeve 67. This scale indicates the distance of the cameras from the center 17. Means for adjusting the focus of the cameras is shown in Fig. 8 and consists of a rod 73 which is threaded in a sleeve 76 which depends from the sleeve 62, the other end 74 of which is rotatively secured to a lug 75 which is attached to the sleeve 64. Obviously by rotating the rod 73 the sleeve 76 being held against movement on the rod 65 by a set screw 77, the lug 75 and in turn the lens will be advanced or retracted and the focus can be adjusted as desired. After the cameras have been adjusted the rods 65 are removed and extension links 78 and 79 are secured to the hinge pins 61 and bolted together by bolts 80. The lenses are also connected by collars 87 having wings 82 which are fastened together by bolts 83. In this manner the multiplicity of cameras become a unitary structure and will operate in the same manner as those shown in Fig. 1.

Having described my invention what I regard as new and desire to secure by Letters Patent is:

1. An apparatus for making stereoscopic pictures consisting of a multiplicity of cameras arranged in the arc of a circle, said cameras having matched lenses of equal focal length, means to simultaneously expose a photographic emulsion in each camera, and means to change the radius of said arc, said means comprising a plurality of rods secured at the center of said arc, said rods being slidably secured to the cameras and means to slide said cameras upon said rods.

2. An apparatus for making stereoscopic pictures consisting of a multiplicity of cameras arranged in the arc of a circle, said cameras having matched lenses of equal focal length, and being hinged to each other, means to simultaneously expose a photographic emulsion in each camera, and means to change the radius of said arc, said means comprising a plurality of rods secured at the center of said arc, said rods being slidably secured to the cameras and means to slide said cameras upon said rods.

3. An apparatus for making stereoscopic pictures consisting of a multiplicity of cameras arranged in the arc of a circle, said cameras having matched lenses of equal focal length, and being hinged to each other, means to simultaneously expose a photographic emulsion in each camera, and means to change the radius of said arc, said means comprising a plurality of rods secured at the center of said arc, said rods being slidably secured to the cameras, means to slide said cameras upon said rods and means to lock said cameras in position.

4. An apparatus for making stereoscopic pictures consisting of a multiplicity of cameras arranged in the arc of a circle, said cameras having matched lenses of equal focal length, means to simultaneously expose a photographic emulsion in each camera, and means in said cameras to ensure the developed negative occupying the exact position it did when exposed.

5. An apparatus for making stereoscopic pictures consisting of a multiplicity of cameras arranged in the arc of a circle, said cameras having matched lenses of equal focal length, means to simultaneously expose a photographic emulsion in each camera, and means on said camera to determine its being correctly positioned.

6. An apparatus for making stereoscopic pictures consisting of a multiplicity of cameras arranged in the arc of a circle, said cameras having matched lenses of equal focal length, and being hinged to each other, means to simultaneously expose a photographic emulsion in each camera, means to change the radius of said arc, said means comprising a plurality of rods secured at the center of said arc, said rods being slidably secured to the cameras, means to slide said cameras upon said rods, means to lock said cameras in position and means to adjust the focus of the lenses of said cameras.

ERNEST E. DRAPER.